Feb. 20, 1923.
V. GENTRY
1,446,173
BEARING DEVICE
Filed Feb. 9, 1921
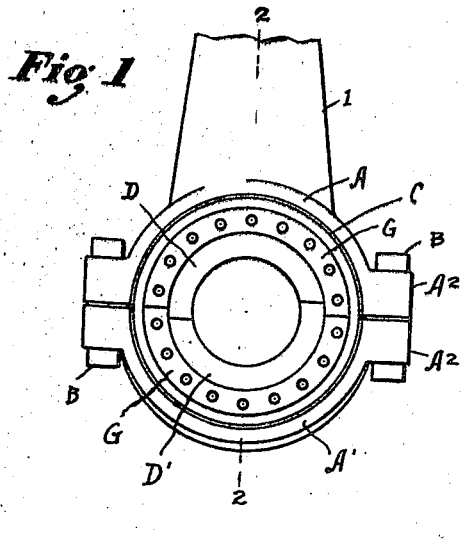
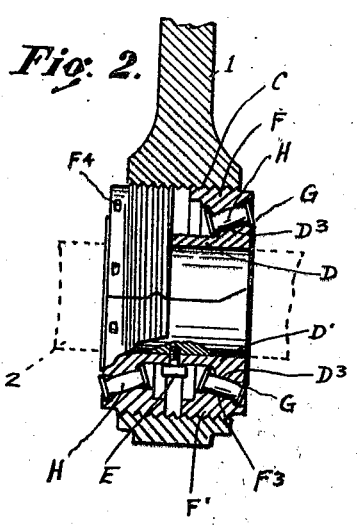
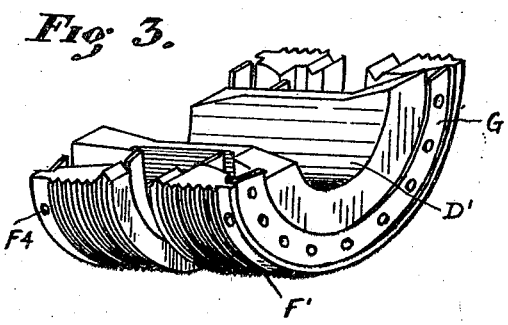
INVENTOR
VERGIL GENTRY.
BY Thomas L. Ryan
ATTORNEY.

Patented Feb. 20, 1923.

1,446,173

UNITED STATES PATENT OFFICE.

VERGIL GENTRY, OF ANDERSON, INDIANA.

BEARING DEVICE.

Application filed February 9, 1921. Serial No. 443,550.

*To all whom it may concern:*

Be it known that I, VERGIL GENTRY, a citizen of the United States, residing at Anderson, in the county of Madison and State of Indiana, have invented certain new and useful Improvements in Bearing Devices, of which the following is a specification.

This invention relates to improvements in anti-friction bearings, and has especial reference to bearings for connecting-rods of that class used in automobile motors. In this type of motor, the several moving parts being enclosed in the motor frame of casement, it is desirable that the different parts, especially the connecting rods may operate indefinitely without need of inspection, adjustment, or repairs.

Accordingly, the object of my invention is to provide a bearing-head of practical and economical construction, which is capable of being easily adjusted to compensate for wear, and which will operate with a minimum of friction.

The objects of my invention are accomplished by, and the invention is embodied in the new construction, combination and arrangement of parts shown in the bearing-head device as illustrated in the accompanying drawings. Suitable characters of reference are applied to the several parts of the device, as they appear in the different views, in which—

Figure 1 is a side view, and

Figure 2 is a transverse central sectional view taken on the line 2—2 in Figure 1.

Figure 3 is a perspective view showing the lower half sections of the several bearing parts of the invention.

This invention contemplates the combination with a divided head member which may be formed integrally with the body portion 1 of a connecting rod, of divided external rings capable of being adjusted to and secured at spaced position in the bore of the head member, a divided internal ring adapted to be secured to the shaft or pin that is to be moved by the connecting rod, anti-friction roller bearing elements between the external ring and the internal ring, and means to secure the segments of the head member together.

The segments A and A$^1$ of the head member are provided with complemental ears A$^2$ through which are passed the securing bolts B and B. The bore C of the head member is threaded, as shown in Figure 2. An internal bearing ring adapted to be fastened to the wrist-pin or shaft 2, consists of complemental semicircular segments D and D$^1$; their meeting faces are of accurately fitted dovetailed construction so that when placed in position, the segments constitute a unit whose parts are secured against longitudinal displacement. Adjacent to the outer edges of the internal bearing ring are provided the inwardly declined beveled annular bearing faces D$^3$. By a cap-screw E one of the segments (namely, the lower segment D$^1$) is secured to the wrist pin 2.

External bearing elements adapted to occupy the bore of the head member, consist of a pair of similarly constructed divided bearing rings, consisting of the complemental semi-circular segments F and F$^1$, their peripheral faces being threaded to fit the threaded bore of the head member, and their meeting faces being of accurately fitted dovetailed construction so that when placed in position the segments constitute units whose parts are secured against longitudinal displacement.

Adjacent to the outer edges of these external bearing rings are provided the inwardly inclined beveled annular bearing faces F$^3$ which register at positions adjacent to the beveled faces D$^3$. At spaced intervals about the outer edges of these divided external rings, are provided recesses F$^4$ into which the tooth of a wrench may be applied for moving the rings in the threaded bore of the head member, to adjusted position, as will be presently referred to.

Arranged between the beveled faces of the internal and external ring members, are roller-bearings. These bearings consist of a pair of semicircular segment frames G in which are retained, at spaced distances apart, a succession of rollers H, whose pintles are journaled in the frame G. In this embodiment of my invention, the segment A of the head-member is formed integral with the connecting rod 1.

To install my invention, the segments F and F are placed at a spaced distance apart in the threaded bore of the segment A. The segment D of the internal bearing ring is then disposed on the wrist pin 2, frames G with their roller bearings are then disposed between the beveled seats of the segments D and F. By a set screw E the segment $D^1$ is then secured to the wrist pin 2 and to its connection and registration with the segment D. The lower segments of the roller-bearing frames G are then placed in position and the external ring segments $F^1$ and $F^1$ are disposed in place in the threaded bore of the segment $A^1$. This segment $A^1$ is then applied to its place at registration with the complemental segment A and the bolts B are inserted and screwed to tightened position. Before finally tightening the bolts, the external bearing rings which now are constituted by the segments F and F and $F^1$ and $F^1$ are turned rotatively toward each other in the bore of the head member until the proper adjustment for the bearing of the rollers H will have been obtained. A tightening then of the bolts E completes the assembly of the several parts.

A bearing device constructed in accordance with my invention will operate with a minimum of friction and a very long time without necessity of adjustment. When adjustment or take-up is desired, the bolts B are slightly loosened, then by shifting one, or perhaps both of the external rings, the proper adjustment is quickly effected; then, by again tightening the bolts B they are tenaciously secured at the adjusted position.

What I claim, and desire to secure by Letters Patent, is—

1. An anti-friction bearing device, comprising a head member divided and having a threaded bore, the parts of the said head member being removably secured together, a divided internal bearing ring adapted to be secured to the journal, a pair of divided external bearing rings each being threaded in the bore of the head member, roller bearings retained in divided frames arranged between the internal bearing rings and the external bearing rings.

2. An anti-friction bearing device, comprising a head member divided and having a threaded bore, the parts of the said head member being removably secured together, a divided internal bearing ring, the two parts being mortised against longitudinal displacement and one of said parts being adapted to be secured to the journal, a pair of divided external bearing rings the parts of each pair being mortised to prevent longitudinal displacement, the said divided external rings being externally threaded to fit the threaded bore of the head member, segmental semicircular frames supporting rollers and which frames are adapted to be retained between the said internal and said external bearing rings, substantially as described.

In testimony whereof I affix my signature.

VERGIL GENTRY.